Patented Jan. 30, 1934

1,945,246

UNITED STATES PATENT OFFICE 1,945,246

SEPARATION OF ORGANIC DIBASIC ACIDS

Heinrich W. Witzel, Ingram, Pa., assignor to The Selden Company, Pittsburgh, Pa., a corporation of Delaware No Drawing. Application September 26, 1930
Serial No. 484,707

10 Claims. (Cl. 260—122)

This invention relates to the recovery of organic acids and more specifically to the recovery and separation of mixtures of organic acids such as are produced as by-products in the catalytic oxidation of organic compounds to intermediate oxidation products.

In the oxidation of many organic compounds to intermediate oxidation products, such as the catalytic oxidation of naphthalene to phthalic anhydride, benzol, phenol and its homologues and compounds containing the group—

$$CH_2-CH=CH-CH_2-$$

to maleic acid, anthracene to anthraquinone with concomitant burning out of impurities, crude or purified phenanthrene to phenanthraquinone, acenaphthene to naphthalic anhydride, furfural to maleic and mesotartaric acids and the like, and in the catalytic purification of crude or semi-purified anthracene, phenanthrene, anthraquinone, and the like mixtures of organic acids are obtained either as the main product or as by-products of the oxidation. For example, the partial oxidation of naphthalene yields, besides phthalic anhydride, mixtures of maleic, fumaric and benzoic acids; phenanthrene yields diphenic acid, phthalic anhydride and maleic acid and furfural yields mixtures of maleic and mesotartaric acids. Likewise in the purification of many of these products, for example in the commercial purification of phthalic anhydride by sublimation processes, waste gases are obtained which contain mixtures of soluble organic acids. The purification of phthalic anhydride by distillation processes produces a residue from which mixtures of phthalic, maleic and fumaric acids can be leached in large quantities, as described in the co-pending application of L. C. Daniels, Serial No. 458,917 filed May 31, 1930 now Patent No. 1,851,383, dated March 29, 1932; similarly the waste gases from the oxidation of anthracene and from which anthraquinone has been condensed contain appreciable amounts of maleic and other water soluble acids. In many cases these acids form either the main product or important by-products of the reactions referred to and their separation and purification is an integral part of the complete process.

According to the present invention these acids are recovered in pure form by crystallization processes, taking advantage of the differences in solubility between the various acids and their alkali metal salts. The invention however is not limited to acids obtained from the catalytic oxidation of organic compounds but is applicable generally to the separation of mixtures of acids having approximately the same solubilities.

It is known that the ionization of organic acids varies between wide limits, and is independent of the solubility of these acids in water. Generally speaking the ionization constants of monobasic acids are small, although such substituted compounds as chloracetic acid and the like form notable exceptions and approach the inorganic acids in strength. There is, however, a wide variation in the strength of the various dibasic and polybasic organic acids as well as between the ionization of their acid salts and the free acid itself. For example the ionization constant of the first hydrogen ion of maleic acid is $1.17 \times 10^{-2}$ at 25° C. while at the same temperature the second hydrogen ion has a constant of $2.00 \times 10^{-7}$. Similarly phthalic acid has constants for its first and second hydrogen ions of $1.21 \times 10^{-3}$ and $3.9 \times 10^{-6}$ respectively. It will thus be seen that the partial neutralization by alkali of mixtures of such acids presents the possibility of forming several different alkali metal compounds which will in many cases have different solubilities. In cases where both acids are monobasic and there is sufficient difference between the solubility of the weaker acid and the salt of the stronger, it is possible to effect a separation by the addition of just enough alkali to neutralize the stronger acid. The same holds true when one or both of the acids are dibasic provided there is sufficient difference between the solubility of the compound that is first formed by partial neutralization and the free acid that is left; that is to say, if the weaker acid is more soluble than the acid salt of the stronger then theoretically it is only necessary to add 1 mole of NaOH to form the acid salt which is to be crystallized out. In the case of mixtures of dibasic acids it is more usual, however, that the value of the ionization constant of at least the first hydrogen of one acid lies between the values of the two ionization constants of the other acid, in which case it is necessary to add sufficient alkali to form both the normal salt of the stronger acid and the acid salt of the weaker. The opposite is true of course where the values of the constants of both hydrogen ions of the weaker acid lie between the values of those of the stronger acid as, for example, in the case of maleic and phthalic acids given, in which case the normal salt of the weaker acid and the acid salt of the stronger are formed. While the invention is by no means limited to the separation of mixtures of dibasic acids, as can be seen from the above discussion, these form perhaps the most important field of its application.

In determining the best conditions for the separation of any given mixture of acids it is of course necessary to determine which of the alkali metals is most suitable for use. In general when salts of a single alkali metal are to be prepared it will be found that the sodium compounds are preferable by reason of the greater differences between the solubility of the normal and acid sodium salts. The invention is not limited however to processes involving the use of only a single alkali metal but on the contrary, as will be more fully pointed out in the accompanying examples, a plurality of alkali metals can in many cases be employed to great advantage.

The preferred modification of the present invention is of course the formation of an acid salt which will separate out from solution, leaving behind either a more soluble free acid or a more soluble neutral salt and it has been found that the sodium compounds are generally more suitable for this purpose than any of the other alkali metal compounds. For example, in the separation of phthalic and maleic acids obtained as by-products in the commercial production of phthalic anhydride referred to the sodium acid maleate formed has a considerably lower solubility in water than the normal sodium phthalate and can be crystallized out in a very pure form and in yields as high as 97%. The maleic acid so obtained is in a particularly good form for the production of succinic acid by the action of zinc dust on a purified maleic acid solution, and yields a succinic acid product of very high purity. The production of succinic acid by this method and the use of the sodium acid maleate obtained from solutions containing phthalic acid for this purpose is not claimed in the present application.

It will be understood that the mixed acid solutions to which the present invention is to be applied may contain many soluble and insoluble impurities of an organic nature, since they are usually obtained by the condensation and absorption of tail gases from catalytic oxidation processes. Frequently such crude solutions may advantageously be given preliminary purification treatments for the removal of a part or all of these impurities; for example the solution containing phthalic and maleic acids referred to may first be extracted with cresol, with or without the addition of hydrocarbons or other solvents which do not dissolve organic acids, such as benzol. The extraction of liquors containing tarry impurities by means of cresol containing solvents is not claimed per se in the present case as it forms the subject matter of the application of Jaeger and Daniels, Serial No. 465,446 filed July 2, 1930, although it may form an important feature in processes of the present invention when used in the recovery of organic acids by partial neutralization.

Representative processes for the separation of mixed acids by the differential solubility of their acid and normal salts will be illustrated in further detail in the accompanying examples, but as has been previously explained the invention is not limited to such specific examples and can be applied in a suitable form to almost any mixture of acids, the salts of which differ in solubility from the acids themselves or which have sufficiently wide differences in solubility between their respective normal and acid salts.

Example 1

Effluent liquor from the fume towers of a commercial phthalic anhydride plant which may be extracted with cresol to remove tarry impurities if desired and which contains 298.3 grams maleic acid and 16.7 grams of phthalic acid per liter is treated with a solution of soda-ash containing 142.8 grams $Na_2CO_3$ per liter. The solution is agitated and a flocculent precipitate forms which increases in volume as the addition of the soda-ash solution proceeds. When sufficient soda-ash has been added to complete the formation of sodium acid maleate the precipitate is dissolved by heating to 75° and allowed to crystallize. The first crop of crystals is collected on a filter and washed, and the filtrate and wash water is evaporated to obtain a second crop, the total yield being 93% of theory based on the amount of maleic acid present. The crystals, which are of 96-98% purity, are dissolved in hot water, treated by stirring with Darco or other decolorizing carbon, and again recrystallized, being in the form of pure white crystals and a total recovery of 91% of the crude crystals being obtained.

Example 2

The dissociation constants of tartaric acid at 25° C. are as follows:

$$K-1 = 970 \times 10^{-6}$$
$$K-2 = 34.3 \times 10^{-6}.$$

A mixture of tartaric and maleic acids, preferably one obtained by the catalytic oxidation of furfural, and containing approximately equal proportions of tartaric and maleic acids is treated as follows:

The solution is divided into two parts. To the first part the theoretical amount of KOH is added to form potassium acid tartrate, which is filtered off, after which the theoretical amount of NaOH is added to the filtrate and the sodium acid maleate is filtered off after crystallization. By this method which does not require evaporation, of the solutions, recoveries of 65% of the tartaric acid and 72% of the maleic acid can be obtained. The tartaric acid can be recovered more completely by adding larger proportions of KOH; for example, the addition of 125% of the theoretical amount of KOH followed by the addition, after filtering of 125% of the theoretical amount of NaOH permits recoveries of 81% of the tartaric acid present, but the recovery of maleic acid drops to 42%.

The second part of the liquid is treated by first adding NaOH to remove the maleic acid, filtering and subsequently adding the KOH to precipitate the tartaric acid. When this method is followed, using theoretical amounts of alkali recoveries of 81% of tartaric acid and 55% of maleic acid are obtained. It is of course understood that more complete recoveries can be obtained by evaporation of the solutions to obtain further batches of crystals, the two alternative methods being only for the purpose of illustrating various modes of application of the invention.

What is claimed as new is:

1. A method of producing organic acids in a state of substantial purity which comprises effecting the vapor phase catalytic oxidation of a cyclic organic compound to intermediate oxidation products with splitting of the ring, removing the major portion of the products from the gas stream, subjecting the tail gases to the action of water, adding alkali to the solution so formed in amounts sufficient for the formation of an acid salt which differs in solubility from the remaining constituents of the solute and separating out the product having the lowest solubility.

2. A method of producing organic acids in a state of substantial purity which comprises effecting the vapor phase catalytic oxidation of a cyclic organic compound to intermediate oxidation products with splitting of the ring, removing the major portion of the product from the gas stream, subjecting the tail gases to the action of water, extracting with a cresol containing solvent the solution so formed, and adding alkali to the purified solution in amounts sufficient for the formation of an acid salt which differs in solubility from the remaining constituents of the solute and separating out the product having the lowest solubility.

3. A method of separating an aqueous solution containing a mixture of maleic and tartaric acids which comprises adding a basic alkali metal compound in amounts insufficient to form neutral salts of both of the acids present but sufficient to form an acid maleate and separating out the acid maleate from the solution.

4. A method of separating maleic and phthalic acids contained in aqueous solution which comprises adding an alkaline sodium compound in amounts sufficient to form sodium acid maleate and normal sodium phthalate and crystallizing out the sodium acid maleate.

5. A method of separating impure maleic and phthalic acids contained in aqueous solution which comprises extracting the solution with a cresol-containing solvent, adding an alkaline sodium compound in amounts sufficient to form sodium acid maleate and normal sodium phthalate and crystallizing out the sodium acid maleate.

6. A process which comprises effecting the vapor phase catalytic oxidation of a polynuclear aromatic hydrocarbon to intermediate oxidation products, separating the major portion of said products from the gas stream, subjecting the tail gases to the action of water, adding alkali to the solution so formed in amounts sufficient for the formation of an acid salt which differs in solubility from the remaining constituents of the solute and separating out the product having the lowest solubility.

7. Process according to claim 6 in which the hydrocarbon is naphthalene and the major portion of the product is phthalic anhydride.

8. Process which comprises effecting the vapor phase catalytic oxidation of furfural to maleic and tartaric acids, dissolving at least a part of the reaction product in water, adding a compound selected from the group consisting of the hydroxides and carbonates of sodium and potassium in amounts sufficient to form an acid salt which differs in solubility from the remaining constituents of the solute, and separating out the product having the lowest solubility.

9. Process which comprises effecting the vapor phase catalytic oxidation of furfural to maleic and tartaric acids, dissolving at least a part of the reaction product in water, extracting the solution with a cresol containing solvent to remove tarry impurities, adding a compound selected from the group consisting of the hydroxides and carbonates of sodium and potassium in amounts sufficient to form an acid salt which differs in solubility from the remaining constituents of the solute, and separating out the product having the lowest solubility.

10. A method of separating maleic and tartaric acids from an aqueous solution containing them which comprises adding a compound selected from the group consisting of the hydroxides and carbonates of sodium and potassium in amount sufficient to form an acid salt of the one of the above named acids which forms the more insoluble acid salt, crystallizing out the salt so formed, filtering, and adding to the filtrate a compound selected from the group above identified but not of the metal first added.

HEINRICH W. WITZEL.